June 12, 1928.

V. C. MATTSON

ROTARY ENGINE

Filed Feb. 28, 1927

Victor C. Mattson
INVENTOR

Victor J. Evans
ATTORNEY

June 12, 1928.

V. C. MATTSON

ROTARY ENGINE

Filed Feb. 28, 1927

Victor C. Mattson
INVENTOR

Victor J. Evans
ATTORNEY

Patented June 12, 1928.

1,673,632

UNITED STATES PATENT OFFICE.

VICTOR C. MATTSON, OF LOOMIS, NEBRASKA.

ROTARY ENGINE.

Application filed February 28, 1927. Serial No. 171,636.

The object of this invention is to provide an engine including a plurality of geared rotatable elements, one of these elements carrying cylinders extending therethrough or formed therewith, and the pistons for the cylinders being operatively connected with the other rotatable element, the shafts for these elements being at an angle with each other.

A further object is to provide intake and exhaust connections for the cylinders, these connections having the novel relation disclosed, with reference to the remainder of the elements of the construction.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

The principal rotatable elements are designated 10 and 12, and these elements are mounted respectively on shafts 13 and 14, to which they are keyed.

Figure 4:
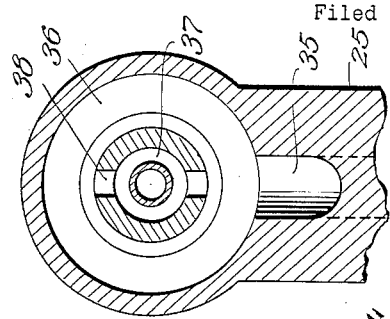
Figure 4 is a section on line 4—4 of Figure 1.
Figure 1:
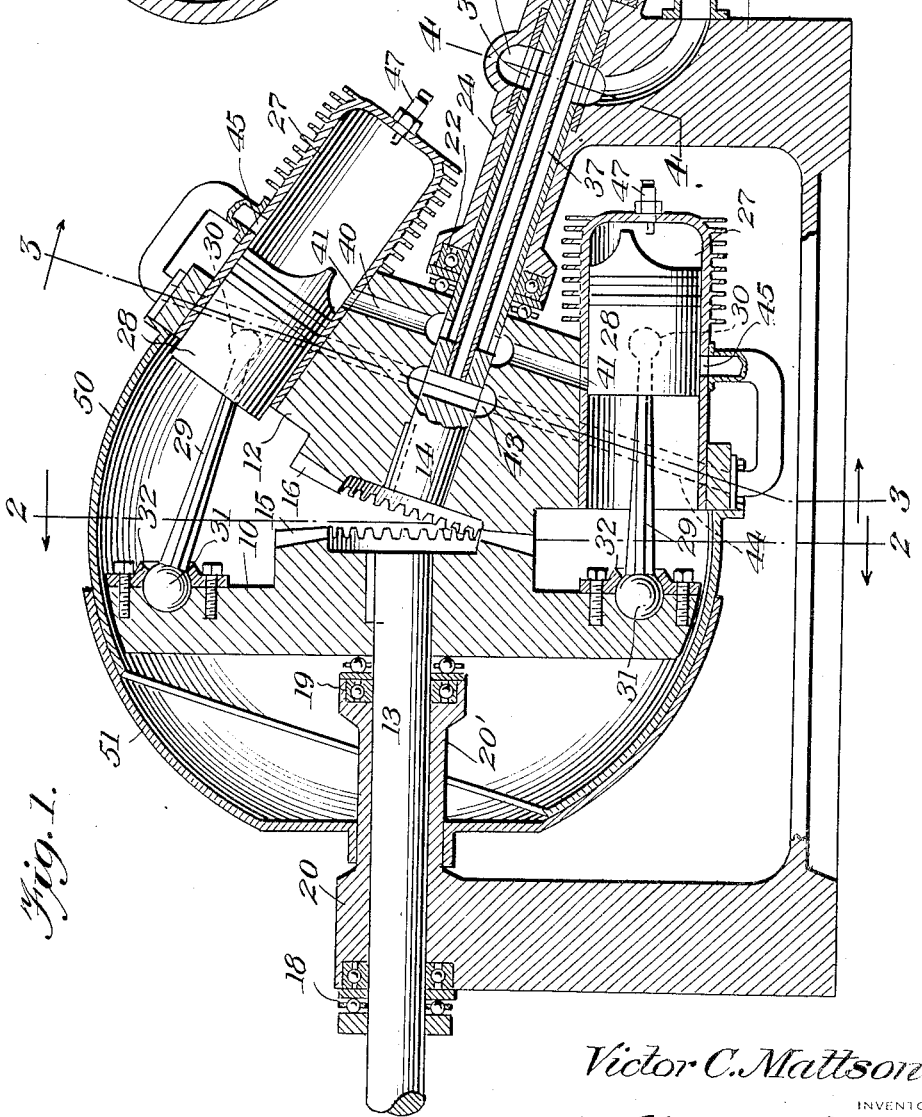
Figure 1 is a view in vertical section, longitudinally of the shafts carrying the main rotatable elements.
Figure 3:
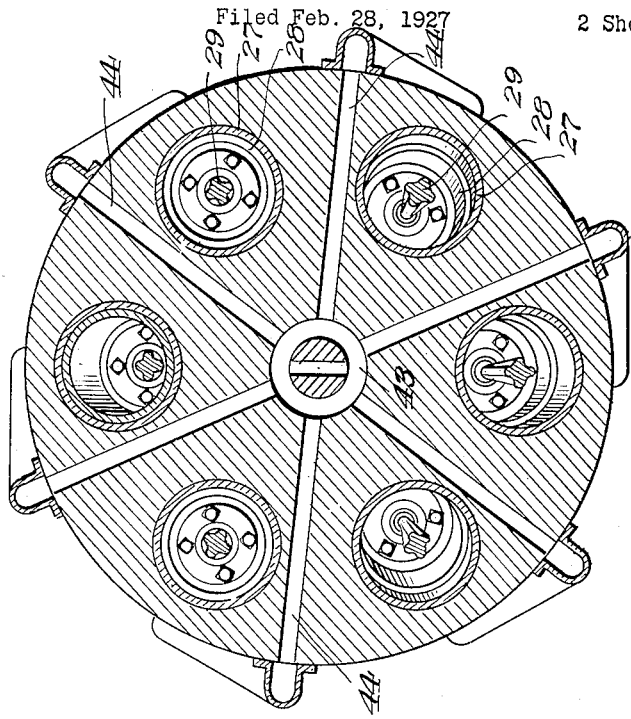
Figure 3 is a section on line 3—3 of Figure 1.
Figure 2:
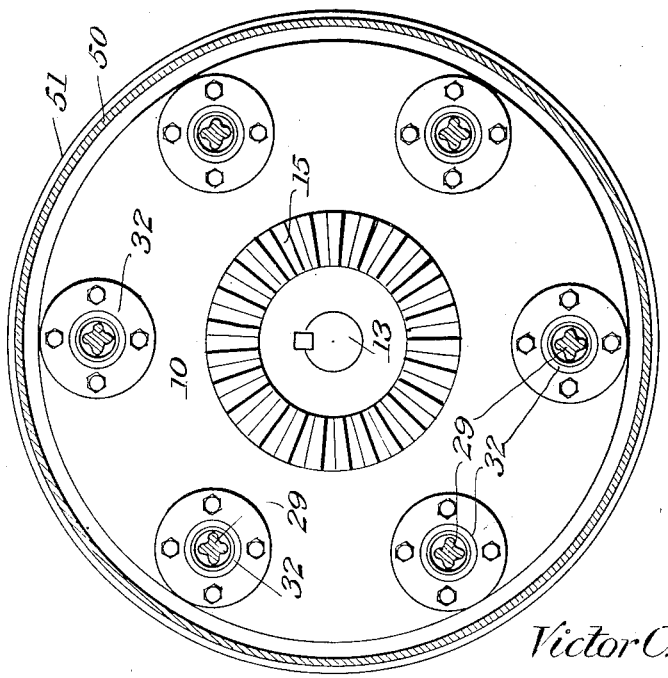
Figure 2 is a section on line 2—2 of Figure 1.

The elements 10 and 12 carry gear teeth at their central portions, as shown at 15 and 16, and gear wheels 15 and 16 are in mesh, although at an angle with each other, as shown in Figure 1. Shafts 13 and 14 are positioned at a similar angle, and shaft 13 is rotatable in bearings 18 and 19 in the frame element 20, shaft 14 being tubular for a considerable portion of its length, and being rotatable in bearings 22 and 23 mounted in the tubular extensions 24 of frame member 25.

Cylinders 27 are mounted in rotatable element 12, or are formed therewith, as may be preferred, and within these cylinders pistons 28 operate, the connecting rods 29 carrying ball members 30 received in socket portions in the pistons, and said members 29 also carrying ball members 31 retained within socket members 32 of the rotatable element 10.

The cylinders 27 are at the angle shown with reference to the axis of rotation of shaft 14, and the shaft itself is inclined as previously indicated, with reference to the axis of rotation of shaft 13 and element 10 rigid therewith.

An intake duct 35 is in communication with annular chamber 36 within the upper portion of the frame element 25, and this chamber 36 is in communication with duct 37 within shaft 14, the connection being by means of a port 38 on each side.

Ducts 40 radiate from tubular shaft 14 and are in communication with the cylinders thru intake ports 41. An exhaust duct 42 communicates with annular space or chamber 43, and ducts 44 extend to the exhaust ports 45 of the respective cylinders. It will be observed therefore that the intake and exhaust ducts are concentrically arranged within the shaft 14. Spark-plugs are designated 47, and the charge is fired when compressed, the engine operating on the two-cycle principle. In Figure 1 the pistons are respectively at the ends of their inner and outer strokes.

A casing or housing includes a two-part structure comprising semi-spherical elements 50 and 51 having the relation shown, the element 51 being carried by the tubular extension 20' of the frame element 20, and the housing element 50 being mounted on the rotatable element 12.

In view of the construction disclosed, the vibration incident to the reciprocating movement of one well known type of engine is avoided, it being the intention that the motion shall be rotary throughout, except so far as the pistons and their connecting rods are concerned.

When the elements 10 and 12, with shafts 13 and 14, rotate, the pistons will move in and out of the cylinders, and when each piston passes to the outer end of its cylinder, the intake port 41 will be uncovered, and a charge of fuel will be forced into the cylinder by suitable means.

As the elements 10 and 12 are positioned at an angle with each other, and rods 29 are positioned as shown, the required timing of the strokes is provided for, and after the compression stroke the charge is fired in each cylinder.

The pressure is exerted upon the pistons thru the connecting rods 29, against element 10, and an equal pressure is exerted on the cylinder head and element 12. The force thus applied will produce the rotation of both elements 10 and 12, the pistons moving to the opposite ends of the cylinders, uncovering the exhaust ports, and after scavenging the cylinders, fuel will again be admitted.

Having described the invention what is claimed is:—

In an engine, a plurality of shafts at an angle with each other, means for mounting the shafts, mantaining them in angular position, meshing toothed elements keyed on the approaching ends of the shafts, cylinders carried by one of said elements, pistons in the cylinders, rods connecting the pistons and the other of said elements, a two-part housing comprising relatively movable members enclosing the meshing toothed elements, one of the housing members being rotatable with one of the toothed elements carrying cylinders, exhaust means, and fuel inlet means connected with said cylinders.

In testimony whereof I affix my sgnature.

VICTOR C. MATTSON.